A. SMITH.
SIDEHILL PLOW CARRIAGE.
APPLICATION FILED MAY 31, 1916.

1,203,065.

Patented Oct. 31, 1916.
2 SHEETS—SHEET 1.

Inventor
A. Smith

By
Attorney

A. SMITH.
SIDEHILL PLOW CARRIAGE.
APPLICATION FILED MAY 31, 1916.
1,203,065.
Patented Oct. 31, 1916.
2 SHEETS—SHEET 2.
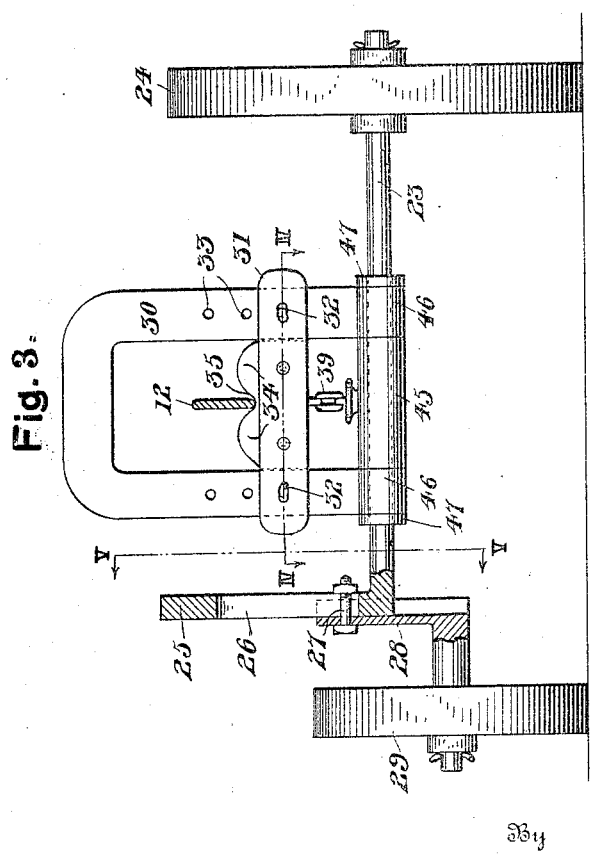
Inventor
A. Smith
By A. M. Wilson
Attorney

UNITED STATES PATENT OFFICE.

ANDY SMITH, OF WADSWORTH, OHIO.

SIDEHILL-PLOW CARRIAGE.

1,203,065.   Specification of Letters Patent.   Patented Oct. 31, 1916.

Application filed May 31, 1916. Serial No. 100,942.

*To all whom it may concern:*

Be it known that I, ANDY SMITH, a subject of the King of Hungary, residing at Wadsworth, in the county of Medina and State of Ohio, have invented certain new and useful Improvements in Sidehill-Plow Carriages, of which the following is a specification.

This invention relates to certain new and useful improvements in side hill plow carriages.

The primary object of the invention is to provide a serviceable plow for side hill use having a supporting draft mechanism adjustable for operative positioning substantially horizontally.

A further object of the device is the provision of a plow provided with a carriage support for the draft portion thereof being adjustable for maintaining the same substantially level during the operative movements of the plow over inclined fields.

A still further object of the device is to provide a plow having a draft support to which the motive power of the device is attached, said support having adjustable ground wheels for advantageously positioning the support during the operation of the plow in side hill work.

With these general objects in view and others that will appear as the nature of the invention is better understood, the same consists in the novel construction, combination and arrangement of parts hereinafter more fully described, illustrated in the accompanying drawings, and then claimed.

Figure 1:
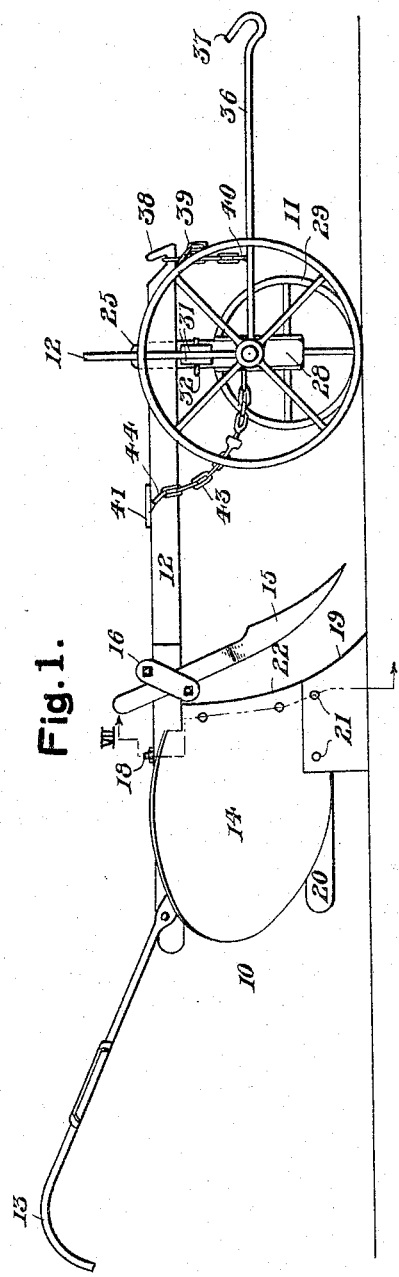
Figure 2:
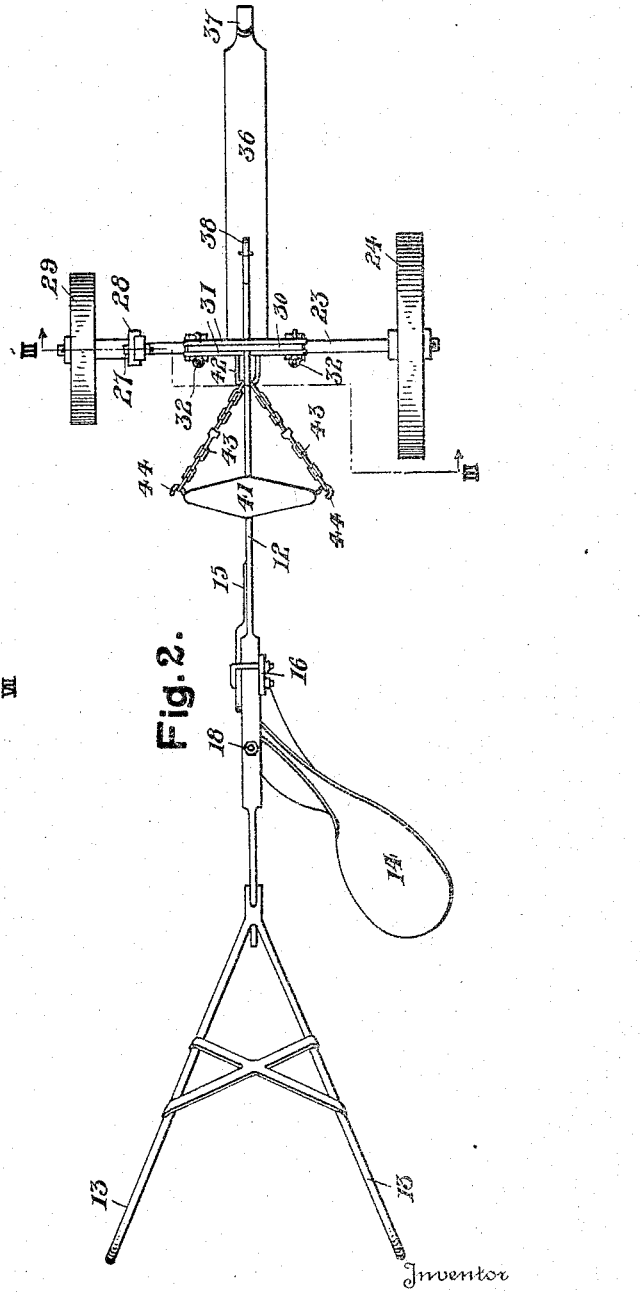

In the drawings forming a part of this application and in which like designating characters refer to corresponding parts throughout the several views:—Figure 1 is a side elevation of the device. Fig. 2 is a top plan view thereof. Fig. 3 is a transverse vertical sectional view taken upon line III—III of Fig. 2. Fig. 4 is a detail horizontal sectional view taken upon line IV—IV of Fig. 3. Fig. 5 is a vertical detail sectional view taken upon line V—V of Fig. 3. Fig. 6 is an elevational view of the opposite side of the main portion of the plow from that shown in Fig. 1, and, Fig. 7 is a vertical sectional view taken upon line VII—VII of Fig. 1.

The present arrangement provides a special form of plow 10 and draft carriage 11 operatively secured together for forward movement under the influence of desirable motive power such as draft animals attached to and forwardly of the said carriage.

The plow 10 provides special features although the same is of the general form of the usual plow construction and provides a plow beam 12 having rear handles 13, a mold board 14, and a colter 15 clamped as at 16 to the beam 12 forwardly of the said mold board. The mold board 14 is provided with an integral post 17 having an upright bolt 18 in the top thereof secured through the beam 12, whereby the mold board is attached to the beam. A shoe 19 having a rearwardly projecting runner 20 is removably attached to the lower forward portion of the mold board 14 and post 17 by means of hold fast devices 21, the forward edges 22 of the said shoe and mold board forming a continuously concave sharpened ground cutting edge.

The carriage 10 consists of an axle 23 having a ground wheel 24 journaled upon one end thereof and having an upright arm 25 at its opposite end provided with a longitudinal slot 26 adapted for the reception of a securing bolt 27 passing through the said slot and through an angular bracket 28 upon which the opposite wheel 29 of the carriage is journaled, the said wheel 29 being considerably smaller than the wheel 24. A yoke 30 is carried in an upright position by the axle 23 having a cross bar 31 mounted thereon and rendered adjustable by means of removable bolts 32 positionable through the opposite ends of the bar 31 and the desired perforations 33 of the yoke 30.

A block 34 is carried upon the bar 31 within the yoke 30 being arranged with a central depression or notch 35 within which the relatively narrow plow beam 12 rests in an edgewise position as best illustrated in Fig. 3 of the drawings.

A tongue or draft pole 36 projects forwardly and centrally from the axle 23 and has a hook 37 at its free end adapted for connection with the propelling means of the plow. A hook 38 is provided on the forward free end of the beam 12 while a chain 39 carried by the hook 38 is secured to the pole 36 as at 40. A plate 41 mounted upon the beam 12 is connected to a ring 42 centrally positioned and rearwardly projecting from the axle 23 by means of chains 43 engaging at their rear ends over hooks 44 upon the opposite ends of the plate 41. The central portion 45 of the axle 23 is preferably enlarged while the lower ends 46 of the yoke 30 are wrapped around the axle 23 adjacent such enlarged portion and securing collars 47 are positioned outwardly of the said yoke ends 46 upon the axle 23, the said yoke being fixedly secured upon the axle in substantially the same upright plane as the arm slot 26.

It will be understood that the device is drawn forwardly by means of the tongue 36, the chains 39 and 43 serving to pull the plow 10 along by means of the plow beam 12 which is maintained substantially horizontal by its seating engagement with the carriage block 34, the plow handles 13 however, being capable of freely manipulating the plow during the operation thereof. The carriage axle 23 is normally maintained horizontal during the operation of the plow, the wheels 24 and 29 thereof being shown in Figs. 1 and 3 of the drawings as adjusted for working upon a horizontal surface. When it is desired to plow a side hill, the bolt 27 will be loosened for adjusting the bracket 28 relatively of the arm 25 for maintaining the axle 23 substantially horizontal regardless of the change in relative positions of the wheels 24 and 29 by reason of the inclination of the land.

A serviceable side hill plow structure is provided by the device, the combination of the plow and carriage being such as to render side hill plowing easier and rendering the operation thereof more advantageous under such circumstances.

While the present form of the invention is believed to be the preferred construction, minor changes may be made without departing from the scope of the appended claim.

What I claim as new is:—

A device of the class described comprising a carriage having an axle, the said axle being enlarged intermediate the ends thereof, a wheel journaled upon one end of the said axle, an opposite wheel of lesser diameter vertically adjustably mounted upon the opposite end of the said axle, an upright yoke secured to the said axle at opposite sides of the enlarged portion thereof, securing collars mounted on the axle at opposite sides of the yoke for retaining the same in position, a vertically adjustable cross bar carried by the said yoke, and a notched plow beam seating member upon the upper side of the said bar.

In testimony whereof I affix my signature.

ANDY SMITH.

Copies of this patent may be obtained for five cents each, by addressing the "Commissioner of Patents, Washington, D. C."